United States Patent [19]
Phillips

[11] 3,884,602
[45] May 20, 1975

[54] ROTARY ENGINE OIL SEAL ASSEMBLY

[75] Inventor: Ronald L. Phillips, Orchard Lake, Mich.

[73] Assignee: General Motors Corporation, Detroit, Mich.

[22] Filed: Jan. 11, 1974

[21] Appl. No.: 432,447

[52] U.S. Cl. .................................. 418/142; 277/35
[51] Int. Cl. ............................................ F01c 19/00
[58] Field of Search .......... 418/142; 277/35, 37, 41, 277/38

[56] References Cited
UNITED STATES PATENTS

| | | | |
|---|---|---|---|
| 3,171,590 | 3/1965 | Bentele et al. | 418/142 |
| 3,179,331 | 4/1965 | Paschke et al. | 418/142 |
| 3,782,869 | 1/1974 | Steinwart et al. | 418/142 |
| 3,822,973 | 7/1974 | Prasse et al. | 418/142 |
| 3,843,283 | 10/1974 | Wilmers | 418/142 |

*Primary Examiner*—William L. Freeh
*Assistant Examiner*—O. T. Sessions
*Attorney, Agent, or Firm*—Charles R. Engle

[57] ABSTRACT

A dual ring oil seal assembly for rotary engines wherein both sealing rings are mounted as an assembly within a single annular groove in a rotor side face. The sealing ring positioned furthermost radially outwardly acts as a gas blow-by seal preventing gas pressures into the lubricated area of the rotor side face. The radially innermost positioned sealing ring acts as an oil seal retaining the oil radially inwardly of the rotor side face. The sealing rings are retained in assembled relationship by a T-shaped annular support member positioned with its cross member forming radial flanges vertically adjacent the bottom of the annular groove and having a detent on its horizontally extending cylindrical central leg. The respective sealing rings contain slots receiving O-ring seals frictionally engaging the central leg cylinder of the annular support member. Each sealing ring is biased outwardly from the radial flanges of the annular support member by a separate annular wave spring. The frictional engagement of the O-ring seals with the support member central leg cylinder maintains the components in assembled relationship.

3 Claims, 4 Drawing Figures

ROTARY ENGINE OIL SEAL ASSEMBLY

This invention relates to a rotary engine oil seal assembly including two separate sealing rings frictionally retained upon an annular support member for mounting in an annular groove in each rotor side face. More specifically, this invention relates to a dual oil seal ring assembly including an annular support member frictionally retaining the dual rings assembled for placement in the single rotor face groove while permitting limited biasing of the rings outwardly into engagement with rotary engine housing end walls.

In the presently commercial rotary engine having a two lobed internal peripheral housing wall and a three lobed planetary rotor, a pair of circular oil seal assemblies are mounted in each side of the rotor in separate annular grooves and are biased by wave springs to sealingly engage stationary housing end walls. One of the oil seal assemblies is used to prevent any gases leaking past gas seals from entering into the lubricated area and the other functions to retain the oil within the engine lubricated area. The seal assemblies each include a sealing ring containing a radially facing groove receiving an O-ring frictionally engaging one side of the rotor groove and the sealing ring preventing flow of fluids around the seal assembly. Use of the separate seal assemblies necessarily requires provision of the separate grooves in each rotor side face and further requires at least two separate assembly functions.

Accordingly, it is a purpose of this invention to provide a single oil seal assembly employing two sealing rings one being effective to prevent blow-by gas entering the lubricated area of a rotor side face and the second being effective to retain oil within the lubrication area of the rotor side face. A single annular groove is provided in each rotor side face to receive the dual ring seal assembly.

A further purpose of this invention is the incorporation of an annular support member mounting the separate sealing rings and frictionally retaining the dual rings assembled so that the seal assembly may be inserted within the annular groove in the rotor side faces as a unit. The support member of my invention is annular in form and T-shaped in cross section with the cross leg of the T being disposed vertically forming radial flanges and the central leg forming a horizontally disposed cylinder so that the flanges are placed adjacent the bottom of the annular seal groove when the seal is assembled within the rotor. An elastomeric member is adhered or otherwise secured to the inwardly facing side of the flanges for engagement with the bottom of the annular seal groove preventing flow of pressure fluids around the annular sealing rings. The upwardly disposed gas blow-by sealing ring contains a downwardly facing groove which receives an O-ring engaging the outer surface of the cylinder while the downwardly disposed oil sealing ring contains an upwardly facing groove receiving an O-ring engaging the inner surface of the cylinder. A pair of annular wave springs are positioned between the respective sealing rings and the flanges so that the sealing rings are continuously biased outwardly for engagement with a housing end wall. The cylinder of the annular support member terminates in a detent positioned a predetermined distance from the radial flanges so that the annular wave springs can bias their respective sealing rings outwardly into engagement with the engine housing end wall. The O-rings roll upon the cylinder when the seal rings move outwardly while being retained thereon by the detent so that the seal in this manner is frictionally retained in an assembled relationship.

An object of this invention is the provision of a new and improved dual ring rotary engine seal arrangement which is frictionally retained in an assembled relationship.

A further object of the present invention is the provision of a rotary engine oil seal assembly including dual sealing rings frictionally retained in an assembled relationship upon an annular support member, the assembly being received within a single annular sealing groove in a rotor side face.

Another object of the present invention is the provision of an annular support member, T-shaped in cross section and having the cross leg of the T disposed vertically forming radial flanges while the central leg of the T extends horizontally forming a cylinder, separate annular seal rings positioned on either side of the cylinder and frictionally retained thereon by respective elastomeric O-rings received in grooves formed in the annular sealing rings, the sealing rings being continuously biased outwardly from the flanges by respective annular wave springs and the components of the seal being frictionally retained in an assembled relationship by a detent formed on the terminal end of the cylinder.

The novel features which I believe to be characteristic of my invention are set forth with particularity in the appended claims. My invention itself, however, both as to its organization and method of operation, may best be understood by reference to the following description taken in connection with the accompanying drawings in which:

Figure 1:
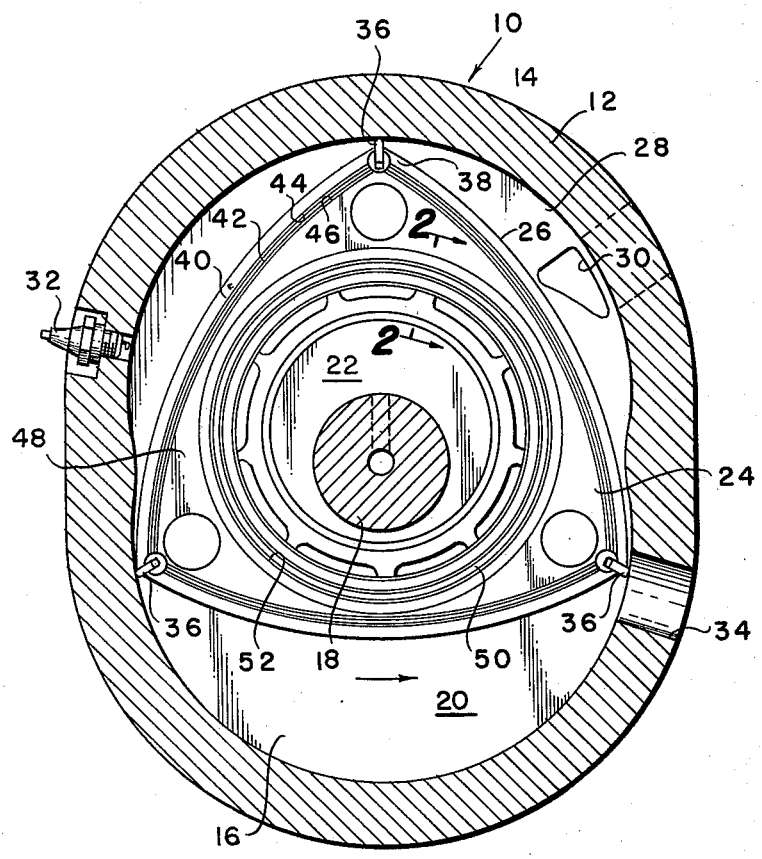
FIG. 1 is a side plan view partly in section illustrating a rotary internal combustion engine including a rotor mounted for planetating movement relative to a crankshaft and disposed within a trochoidal cavity defined by the engine housing, the rotor including side mounted seal assemblies in accordance with my invention.

Referring now to FIG. 1 a rotary engine 10 including a central housing portion 12 having an internal peripheral surface 14 defining a cavity 16 in the form of a two lobed trochoid, or defined by a curve parallel thereto, receives a crankshaft 18 rotatably supported in end housing members, only one of such members 20 being shown. The crankshaft 18 includes an eccentric 22 which rotates within cavity 16 and rotatably supports a rotor 24 having a generally triangular form. The rotor 24 planetates relative to the crankshaft 18 by virtue of engaged phased gears, not shown. The rotor 24 includes peripheral surfaces 26 cooperating with housing internal peripheral surface 14 to define three separate working chambers 28 of varying volume as they move with the rotor surfaces 26 within trochoidal cavity 16. End housing member 20 includes an inlet passage 30 supplying a combustible air-fuel mixture to the working chambers as the rotor rotates counterclockwise in FIG. 1 for subsequent compression adjacent a spark plug 32 where the compressed mixture is ignited via a timed pulse in an ignition circuit. Continued rotation of the rotor 24 eventually sweeps the burned gases through an exhaust port 34 in central housing member 12.

The working chambers 28 are sealed from one another via usual apex seal assemblies 36 positioned in apexes 38 of the rotor 24. Gas seal assemblies 40 and 42 are provided in grooves 44 and 46 to prevent the passage of combustion gases interiorly on the rotor side faces 48. Also an oil seal assembly 50, which is the subject of my invention, is provided in a groove 52 radially interiorly of the gas seals 40 and 42 to prevent leakage of lubricating oil exteriorly on the rotor side faces 48.

Figure 2:
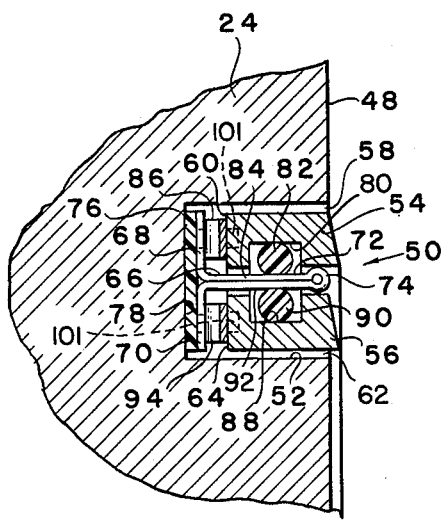
FIG. 2 is an enlarged fragmentary sectional view more specifically illustrating the seal assembly of my invention.

Referring now to FIG. 2, the oil seal assembly 50 constructed in accordance with my invention requires the machining of a single annular groove 52 in side face 48 of rotor 24 as distinguished from the requirement of two separate grooves in the usual rotary engine rotor seal arrangement. Utilization of a single seal groove 52 is accomplished by providing a seal assembly 50 including dual sealing rings 54 and 56 assembled into a single unit. In this manner, the radially outwardly disposed sealing ring 54 is effective to seal any blow-by gases that may leak past the gas sealing rings 40 and 42. Should any gas pressure develop between the gas sealing rings 40 and 42 and outer oil ring 54, the gases flow into a space 58 on the radially outward side of ring 54 and enter into groove 52 applying a fluid pressure on the back side 60 of ring 54 thereby assisting engagement of the ring with an associated housing end member 20. Likewise, oil under pressure on the radially inward side of ring 54 enters a space 62 between the ring 56 and groove 52 and flows around the ring and against its back side surface 64 thereby aiding engagement of ring 56 with end housing member 20.

Figure 3:
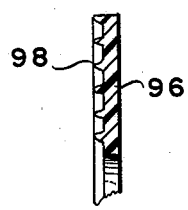
FIG. 3 is an enlarged fragmentary view of a modified form of an elastomeric seal member incorporated in my seal assembly.
Figure 4:
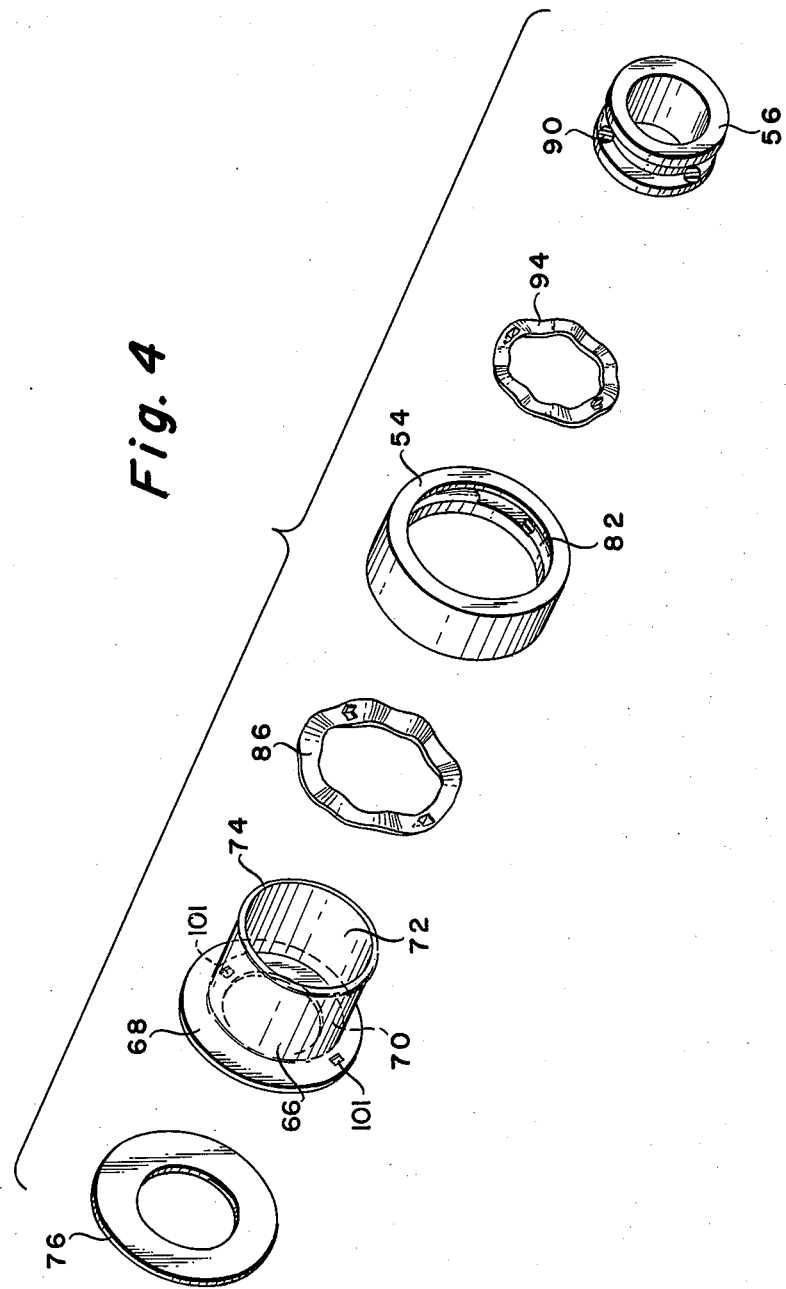
FIG. 4 is an exploded perspective view showing the components of my seal assembly.

The seal assembly 50 as best illustrated in FIG. 4, includes an annular support member 66 having a T-shaped cross section positioned in groove 52 such that the cross legs, which are in the form of radially outwardly and radially inwardly extending flanges 68 and 70, extend in a vertical direction while the central leg, which is in the form of a cylinder 72, extends horizontally and terminates in a bulbous detent member 74. The radial flanges 68 and 70 have an elastomeric annular sealing member 76 adhered thereto for sealing engagement with bottom wall 78 of the groove 52. Sealing ring 54 includes a downwardly facing rectangular groove 80 receiving an elastomeric O-ring 82 which frictionally engages both the ring 54 and outer surface 84 of the central leg cylinder 72. An annular wave spring 86 is positioned between the radially outward flange 68 and the back side surface 60 of ring 54 so that its alternate undulations engage the flange 68 and ring 54 continuously biasing it outwardly in groove 52 against the housing end member 20. In a similar manner the sealing ring 56 includes a rectangular groove 88 receiving an elastomeric O-ring 90 frictionally engaging ring 56 and an inner surface 92 of cylinder 72 providing a fluidtight seal therebetween. A second annular wave spring 94 is positioned between the radially inward flange 70 and the back surface 64 of ring 56 such that the ring is continuously biased outwardly against housing end member 20 providing a fluid-tight seal therebetween. A modified form of the annular sealing member 76 is illustrated in FIG. 3 wherein an annular sealing member 96 includes a plurality of annular ridges 98 for sealingly engaging bottom surface 78 of the groove 52 preventing leakage in groove 52 behind the assembled seal 50. The wave springs 86 and 94 include oppositely extending struck out antispin tangs 100 which engage notches 101, in flanges 68 and 70 shown in FIG. 4 and in surfaces 60 and 64 of rings 54 and 56, shown in FIG. 2.

During assembly of the seal 50, wave spring 86 is first placed upon the support central leg cylinder 72 against radial flange 68. The ring 54 and its associated O-ring 82 are then also positioned on the outer surface 84 of cylinder 72 with the spring engaging back surface 60 of ring 54. O-ring 82 is sized so that it frictionally engages both ring 54 and surface 84 of the cylinder 72 as shown in FIG. 2. Likewise, the spring 94 is placed against radial flange 70 within the cylinder 72. The sealing ring 56 with its associated O-ring 90 is then assembled within the cylinder 72, the O-ring 90 being sized to frictionally engage both the ring 56 and the inner cylinder surface 92. This frictional engagement of sealing rings 54 and 56 by the O-rings 82 and 90 and the detent 74 retains them assembled on the cylinder 72.

The bulbous detent 74 formed on the terminal end of cylinder 72 is positioned a predetermined distance from the outwardly and inwardly extending flanges 68 and 70 so that the O-rings 82 and 90 can roll upon the outer surface 84 and the inner surface 92, respectively, of cylinder 72 permitting normal extension of rings 54 and 56 outwardly of groove 52 by the wave springs 86 and 94 into positive engagement with housing end member 20 providing a positive seal thereagainst. The bulbous detent member 74 is specifically positioned to permit an adequate extension movement of both rings 54 and 56 while also being positioned to prevent the O-rings 82 and 90 from rolling off the cylinder 72 whereby the components of the seal are retained in an assembled relationship for mounting on the rotor.

From the above description it is obvious that my invention through the provision of a frictionally assembled seal assembly dual sealing rings are retained upon a single annular support member for ease in positioning the unit within a single seal groove in a rotor side face. This arrangement eliminates the necessity of machining more than one groove in the rotor side face and likewise eliminates the necessity of assembling two separate rings in these grooves.

While I have shown and described a particular embodiment of my invention it will, of course, be understood that various modifications and alternative constructions thereof may be made without departing from the true spirit and scope of my invention and that I intend by the appended claims to cover all such modifications and alternative constructions as fall within the true spirit and scope of my invention.

I claim:

1. In a rotary engine having a housing with an inwardly facing peripheral wall and oppositely facing inner side walls cooperatively defining a cavity, a crankshaft rotatably supported in said housing, said crankshaft having an eccentric located in said cavity, a rotor rotatably mounted on said eccentric in said cavity, said rotor having sides facing said side walls and peripheral faces facing said peripheral wall defining a plurality of chambers that are spaced about and move with said rotor while varying in volume as said rotor rotates, an annular seal groove in each side of said rotor with its center on the rotor axis, the improvement comprising; a seal assembly comprising in combination an annular supporting member having a T-shaped cross section including a horizontally disposed cylinder and vertically disposed radial flanges extending radially outwardly and radially inwardly of the cylinder, a first sealing ring positioned radially outwardly of the cylinder of said annular member and containing a substantially centrally located groove facing said cylinder, an O-ring seal disposed in said groove engaging said cylinder of said annular member, a first annular wave spring engaging a portion of said flange extending radially outward of said cylinder of said annular member and engaging said first sealing ring biasing it outwardly in said rotor annular groove, a second annular sealing ring disposed in said rotor groove radially inwardly of said cylinder and containing a groove facing said cylinder, a second O-ring seal in said groove engaging said second sealing ring and said cylinder of said annular member, a second annular wave spring engaging a portion of said flange extending radially inwardly of said cylinder of said annular support member and engaging said second sealing ring biasing it outwardly in said rotor annular groove, an elastomeric annular seal member bonded to the back side of said flanges of said annular supporting member, and a detent member on the terminal end of said annular support member cylinder retaining said O-rings and thereby said seal rings and said wave biasing springs in assembled relationship whereby said seal assembly can be inserted within the circular rotor seal groove as an assembled unit.

2. In a rotary engine having a housing with an inwardly facing peripheral wall and opppositely facing inner side walls cooperatively defining a cavity, a crankshaft rotatably supported in said housing, said crankshaft having an eccentric located in said cavity, a rotor rotatably mounted on said eccentric in said cavity, said rotor having sides facing said side walls and peripheral faces facing said peripheral wall defining a plurality of chambers that are spaced about and move with said rotor while varying in volume as said rotor rotates, an annular seal groove in each side of said rotor with its center on the rotor axis, the improvement comprising; a seal assembly comprising in combination an annular support member T-shaped in cross section, the central leg of said annular support member being in the form of a cylinder extending axially parallel to said crankshaft and having a detent on its terminal end, the cross portion of said T-shaped annular support member extending vertically normal to the axis of said crankshaft and including a first radially outwardly extending flange and a second radially inwardly extending flange, a first sealing ring positioned radially outwardly of said annular support cylinder and adjacent the radially outwardly extending flange, an annular wave spring engaging said radially outwardly extending flange and said sealing ring biasing said sealing ring outwardly from said annular seal groove, said first sealing ring containing a radially inwardly facing groove, an O-ring seal in said groove frictionally engaging said first sealing ring and said cylinder, a second sealing ring positioned radially inwardly of said cylinder of said annular support member and adjacent said radially inwardly extending flange, a second annular wave spring engaging said radially inwardly extending flange and said second sealing ring biasing it outwardly from said annular seal groove, said second sealing ring containing a radially outwardly facing groove, and a second O-ring seal in said groove frictionally engaging said second sealing ring and said cylinder, the frictional engagement of said O-ring seals with said cylinder and said detent of said annular support member retaining the components of said seal in assembled relationship for insertion within the annular seal grooves in each rotor face, said detent being positioned a predetermined distance from said radial flanges permitting rolling movement of said O-rings on said cylinder whereby said wave springs maintain said sealing rings in engagement with said housing side walls when said seal assembly is placed in said annular rotor seal grooves.

3. In a rotary engine having a housing with an inwardly facing peripheral wall and oppositely facing inner side walls cooperatively defining a cavity, a crankshaft rotatably supported in said housing, said crankshaft having an eccentric located in said cavity, a rotor rotatably mounted on said eccentric in said cavity, said rotor having sides facing said side walls and peripheral faces facing said peripheral wall defining a plurality of chambers that are spaced about and move with said rotor while varying in volume as said rotor rotates, a circular seal groove in each side of said rotor with its center on the rotor axis, the improvement comprising; a seal assembly comprising in combination an annular support member of T-shaped cross section including a horizontal cylinder extending parallel to the axis of said crankshaft and outwardly and inwardly radially extending flanges, a bulbous detent on the terminal end of said cylinder, the radial flanges being positioned adjacent the bottom of the respective circular seal grooves when mounted in said rotor, an annular elastomeric member adhered to both of said flanges thereby extending across said cylinder for sealing engagement with the bottom of each said circular seal grooves, a first sealing ring positioned radially outwardly of said cylinder and adjacent said radially outwardly extending flange, said first sealing ring containing a radially inwardly facing slot opening toward said cylinder of said annular support member, an O-ring seal in said slot frictionally engaging said cylinder and the bottom of said radially inwardly facing sealing ring slot, an annular wave spring engaging said radially outwardly extending flange and said first sealing ring biasing the sealing ring outwardly from said circular seal groove, a second sealing ring positioned radially inwardly of said cylinder of said annular support member and adjacent said radially inwardly extending flange, said second sealing ring containing a radially outwardly facing groove opening toward said cylinder, an O-ring seal in said second ring groove frictionally engaging said second sealing ring and said cylinder, an annular wave spring engaging said radially inwardly extending flange, the frictional engagement of said O-ring seals with said first sealing ring, said second sealing ring, said cylinder of said T-shaped annular support member and said bulbous detent retaining the seal in assembled relationship whereby it may be inserted into a circular seal groove in a side face of said rotor as a unit thereby providing a dual seal from an assembled position within the single circular seal groove, said bulbous detent on said cylinder permitting limited rolling movement of said O-rings on said cylinder whereby said wave springs are operable extending said sealing rings into engagement with said housing side walls.

* * * * *